(12) United States Patent
Marsh et al.

(10) Patent No.: US 7,753,151 B2
(45) Date of Patent: *Jul. 13, 2010

(54) ELECTRIC WHEEL MOTOR ASSEMBLY

(75) Inventors: Gregory A. Marsh, Ferndale, MI (US); Herbert L. Adams, Waterford, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 13 days.

This patent is subject to a terminal disclaimer.

(21) Appl. No.: 12/245,220

(22) Filed: Oct. 3, 2008

(65) Prior Publication Data

US 2009/0032321 A1  Feb. 5, 2009

Related U.S. Application Data

(63) Continuation of application No. 11/514,064, filed on Aug. 31, 2006, now Pat. No. 7,445,067.

(51) Int. Cl.
*B60K 1/00* (2006.01)
(52) U.S. Cl. .............. 180/65.51; 180/65.1; 180/372
(58) Field of Classification Search ........... 180/65.5, 180/65.6, 253, 372, 65.51, 65.1; 280/124.145, 280/93.512; 310/67 R, 109, 83; 188/218 XL, 188/264 AA; 475/338
See application file for complete search history.

(56) References Cited

U.S. PATENT DOCUMENTS

| | | | | |
|---|---|---|---|---|
| 1,997,974 A | * | 4/1935 | Moore et al. .............. 310/67 R |
| 2,142,872 A | * | 1/1939 | Haushalter ................. 267/281 |
| 3,812,926 A | | 5/1974 | Tidwell | |
| 3,812,928 A | | 5/1974 | Rockwell et al. | |
| 3,827,534 A | * | 8/1974 | Brooks ......................... 188/68 |
| 4,005,768 A | * | 2/1977 | Bubnash et al. ......... 188/218 A |
| 4,330,045 A | | 5/1982 | Myers | |
| 4,374,533 A | * | 2/1983 | Svensson ................. 144/208.9 |
| 4,930,590 A | | 6/1990 | Love et al. | |
| 5,014,800 A | * | 5/1991 | Kawamoto et al. ......... 180/65.5 |
| 5,087,229 A | | 2/1992 | Hewko et al. | |
| 5,156,579 A | | 10/1992 | Wakuta et al. | |
| 5,163,528 A | | 11/1992 | Kawamoto et al. | |
| 5,172,485 A | | 12/1992 | Gerhard et al. | |

(Continued)

FOREIGN PATENT DOCUMENTS

JP  7 17425  1/1995

(Continued)

OTHER PUBLICATIONS

"Racing Brake"; www.racingbrake.com/main/technology.asp; Copyright 1985; pp. 1-2.

*Primary Examiner*—Hau V Phan
(74) *Attorney, Agent, or Firm*—Harness, Dickey & Pierce, P.L.C.

(57) ABSTRACT

A drive axle assembly for driving a wheel of a vehicle includes a moveable suspension arm and a wheel spindle fixed to the suspension arm. A planetary gearset includes a sun gear, a ring gear and a carrier rotatably supporting a plurality of planet gears in meshed engagement with the sun gear and the ring gear. The carrier encompasses the wheel spindle and is drivingly connected to the wheel. An electric motor includes a rotor and a stator. The rotor drives the sun gear.

27 Claims, 9 Drawing Sheets

U.S. PATENT DOCUMENTS

| | | | |
|---|---|---|---|
| 5,180,180 A * | 1/1993 | Yamashita et al. | 180/253 |
| 5,382,854 A | 1/1995 | Kawamoto et al. | |
| 5,472,059 A | 12/1995 | Schlosser et al. | |
| 5,633,544 A | 5/1997 | Toida et al. | |
| 5,878,848 A | 3/1999 | Zhang | |
| 6,253,437 B1 | 7/2001 | Levin | |
| 6,315,092 B1 | 11/2001 | Schwarz et al. | |
| 6,590,306 B2 | 7/2003 | Terada | |
| 6,722,459 B1 * | 4/2004 | Wendl et al. | 180/65.5 |
| 6,752,227 B1 | 6/2004 | Bachmann | |
| 6,768,932 B2 | 7/2004 | Claypole et al. | |
| 6,811,514 B2 * | 11/2004 | Bowman | 475/338 |
| 6,942,049 B2 | 9/2005 | Shimizu | |
| 7,097,007 B2 * | 8/2006 | Lin | 188/218 XL |
| 7,219,777 B2 * | 5/2007 | Lin | 188/218 XL |
| 7,228,928 B2 | 6/2007 | Mizutani et al. | |
| 7,320,376 B2 * | 1/2008 | Kurata | 180/65.5 |
| 7,350,605 B2 | 4/2008 | Mizutani et al. | |
| 7,350,606 B2 | 4/2008 | Brill et al. | |
| 7,445,067 B2 * | 11/2008 | Marsh et al. | 180/65.5 |
| 2005/0061565 A1 | 3/2005 | Mizutani et al. | |
| 2005/0269174 A1 | 12/2005 | Lin | |

FOREIGN PATENT DOCUMENTS

| | | |
|---|---|---|
| JP | 2000 52788 | 2/2000 |
| JP | 2002 247713 | 8/2002 |
| JP | 2005 081871 | 3/2005 |

\* cited by examiner

ELECTRIC WHEEL MOTOR ASSEMBLY

CROSS-REFERENCE TO RELATED APPLICATIONS

This application is a continuation of U.S. patent application Ser. No. 11/514,064 filed on Aug. 31, 2006. The disclosure of the above application is incorporated herein by reference.

FIELD

The present teachings relate to a part time hybrid electric all wheel drive system and more particularly relate to a pair of compact electric wheel motor assemblies that can selectively drive a pair of wheels that are not otherwise driven by an engine.

BACKGROUND

Typically, a hybrid electric all wheel drive system includes an electric motor and an internal combustion engine. The internal combustion engine drives the front wheels and a centrally mounted electric motor couples to a rear axle to drive the rear wheels.

Space under a vehicle is relatively limited and the above example requires the rear axle in addition to a relatively large centrally mounted electric motor. While the above system works well in various applications, there remains room in the art for improvement.

SUMMARY

A drive axle assembly for driving a wheel of a vehicle includes a moveable suspension arm and a wheel spindle fixed to the suspension arm. A planetary gearset includes a sun gear, a ring gear and a carrier rotatably supporting a plurality of planet gears in meshed engagement with the sun gear and the ring gear. The carrier encompasses the wheel spindle and is drivingly connected to the wheel. An electric motor includes a rotor and a stator. The rotor drives the sun gear.

In another arrangement, a drive axle assembly for driving first and second rear wheels of a vehicle includes a rear suspension having first and second spaced apart wheel spindles respectively fixed to individually moveable first and second suspension arms. A first electric motor is fixed to the first suspension arm and is adapted to independently drive the first rear wheel. A second electric motor is fixed to the second suspension arm and is adapted to independently drive the second rear wheel.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
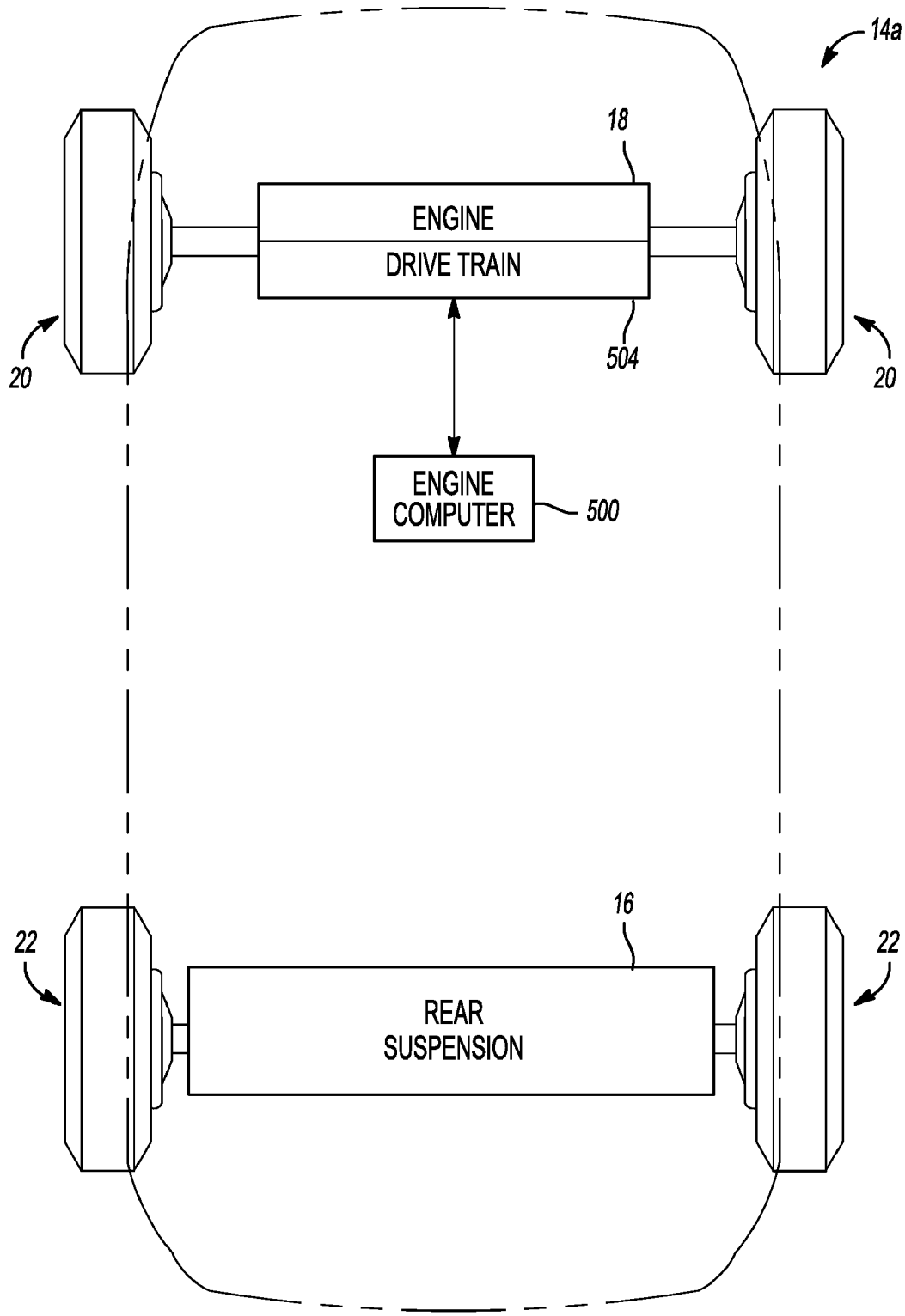
FIG. 1 is a diagram showing a vehicle with a front wheel drive configuration that can accept an electric all wheel drive system.

The following description is merely exemplary in nature and is not intended to limit the present teachings, their application, or uses. It should be understood that throughout the drawings, corresponding reference numerals can indicate like or corresponding parts and features.

Figure 3:
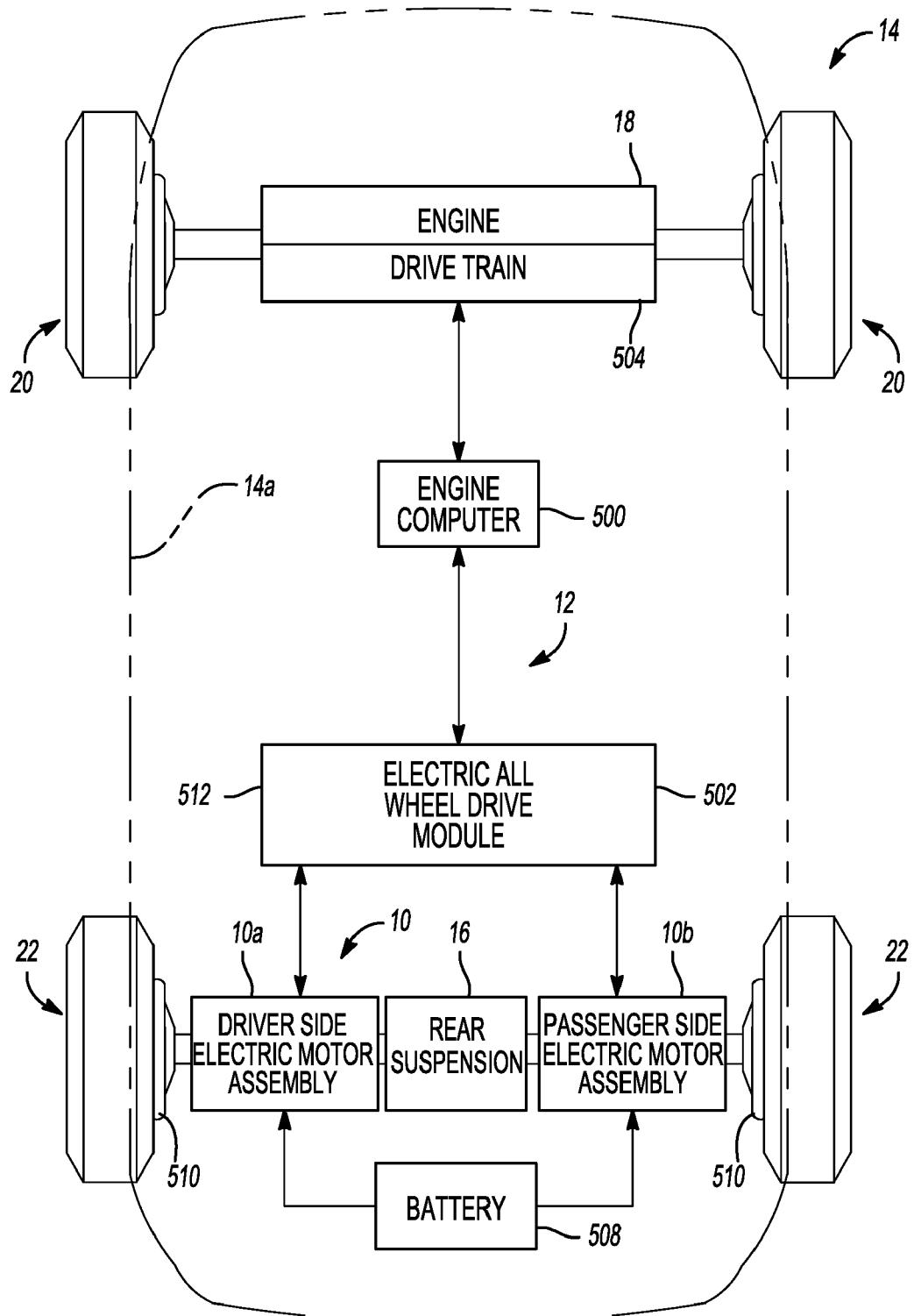
FIG. 3 is a diagram of a hybrid electric all wheel drive system constructed in accordance with the present teachings showing a pair of electric wheel motor assemblies coupled to the vehicle of FIG. 1.
Figure 4:
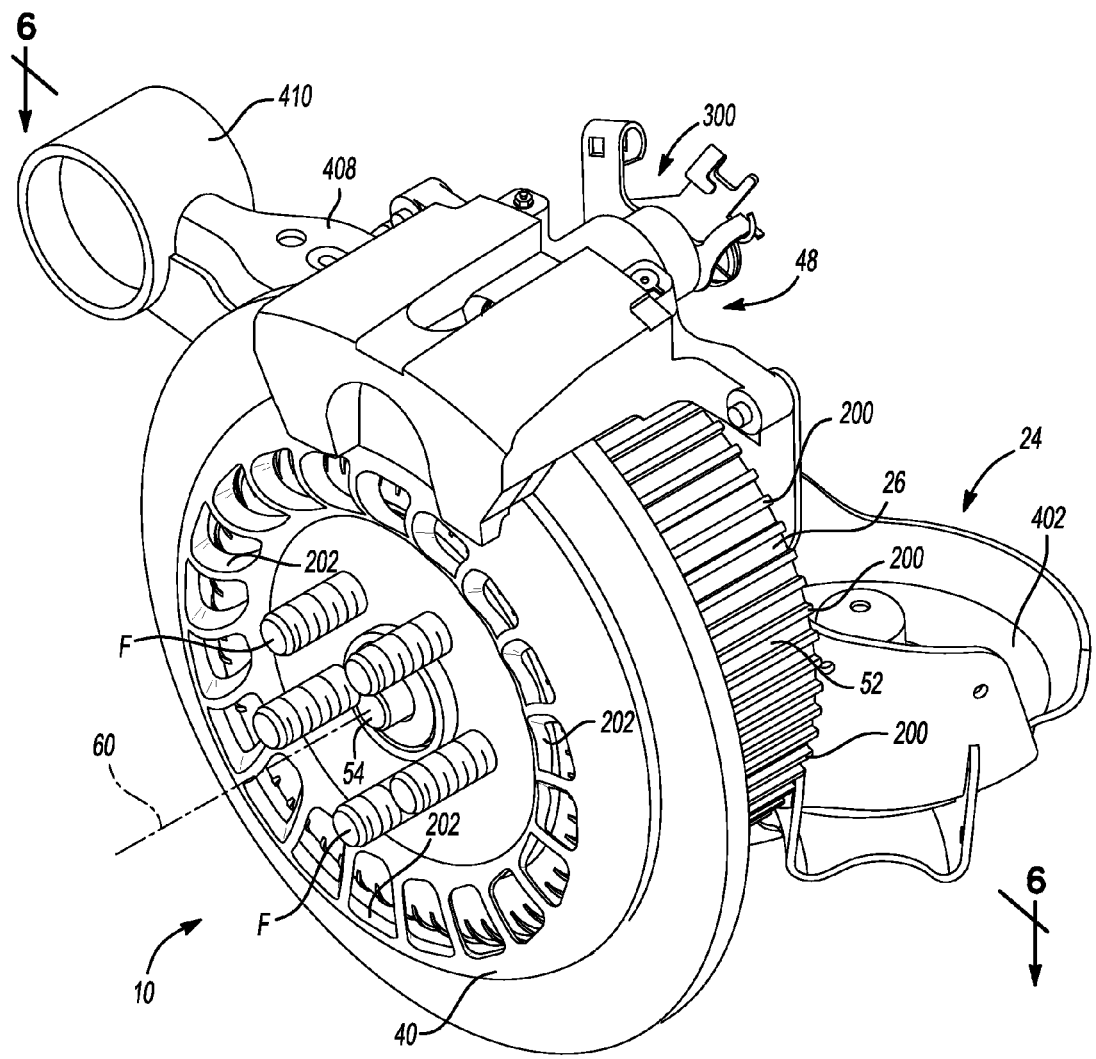
FIG. 4 is a perspective view of an electric wheel motor assembly constructed in accordance with the present teachings showing an outboard side thereof.

With reference to FIGS. 3 and 4, the present teachings generally include an electric wheel motor assembly 10. A hybrid electric all wheel drive system 12 can be implemented on a vehicle 14. The all wheel drive system 12 can include a driver side electric wheel motor assembly 10a and a passenger side electric wheel motor assembly 10b, which can be collectively referred to as the electric wheel motor assemblies 10. Each of the electric wheel motor assemblies 10 can couple to a rear suspension 16 that can couple to a vehicle body 14a and/or other suitable suspension components, such as springs or shocks. Each of the electric wheel motor assemblies 10 can be selectively engaged to provide all-wheel drive on a part time basis.

The vehicle 14 can include an engine 18 driving front wheels 20. The electric motor assemblies 10 can replace a conventional wheel and a wheel mounting structure (not specifically shown) that would otherwise rotatably support the rear wheels 22 and couple the rear wheels 22 to the vehicle 14. It will be appreciated that the vehicle 14 can be equipped with the conventional wheel and wheel mounting structure and can be subsequently retrofit with the electric motor assemblies 10. Moreover, the electric motor assemblies 10 can be provided as original equipment in lieu of the conventional wheel and wheel mounting structure.

Figure 2:
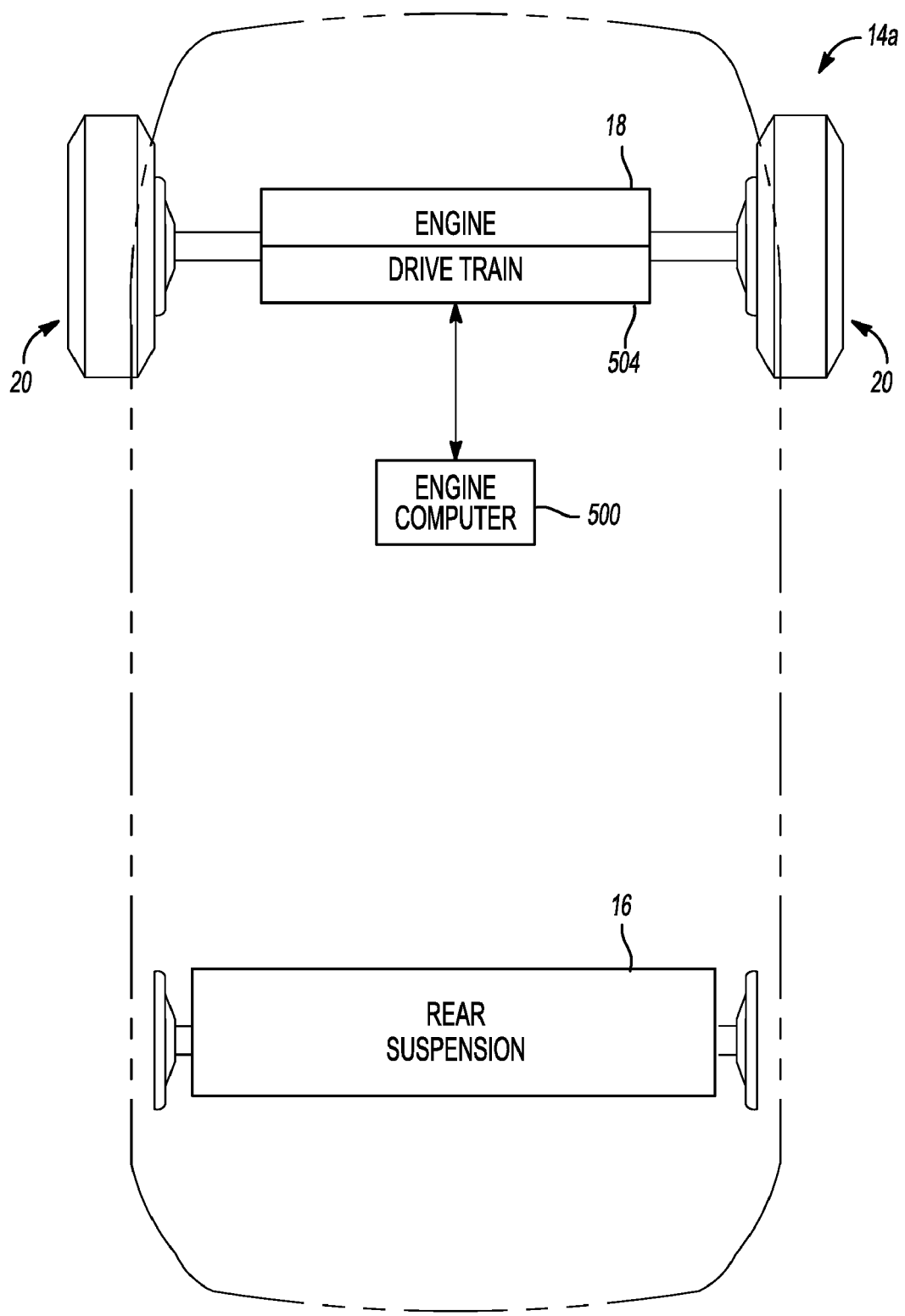
FIG. 2 is similar to FIG. 1 and shows the rear wheels removed from the vehicle.

With reference to FIG. 1, the vehicle 14 can have a front wheel drive configuration. The front wheel drive configuration includes the engine 18 that can drive the front wheels 20. The rear wheels 22 can be coupled to the rear suspension 16 and can receive no power from the engine 18. With reference to FIG. 2, the rear wheels 22 (FIG. 1) can be removed from the vehicle 14 leaving portions of the rear suspension 16 exposed. With reference to FIG. 3, the vehicle 14 can include the retrofit or original equipment electric wheel motor assemblies 10 that can couple to the rear suspension 16. The rear wheels 22 can couple to the electric motor assemblies 10, respectively.

While the vehicle 14 is illustrated as having a front wheel drive powertrain that serves as the primary source of propulsive power and the hybrid electric all wheel drive system 12 that provides supplemental power to the rear wheels of the vehicle 14, it will be appreciated that the all wheel drive system 12 can also be implemented so that the electric motor assemblies 10 can drive the front wheels 20, while the rear wheels 22 can be driven by the engine 18. The all wheel drive system 12 can also be independent of a certain type of engine in the vehicle 14 such that the engine 18 can be an internal combustion engine, a hybrid configuration, an electric motor, other suitable power sources and combinations thereof.

Figure 5:
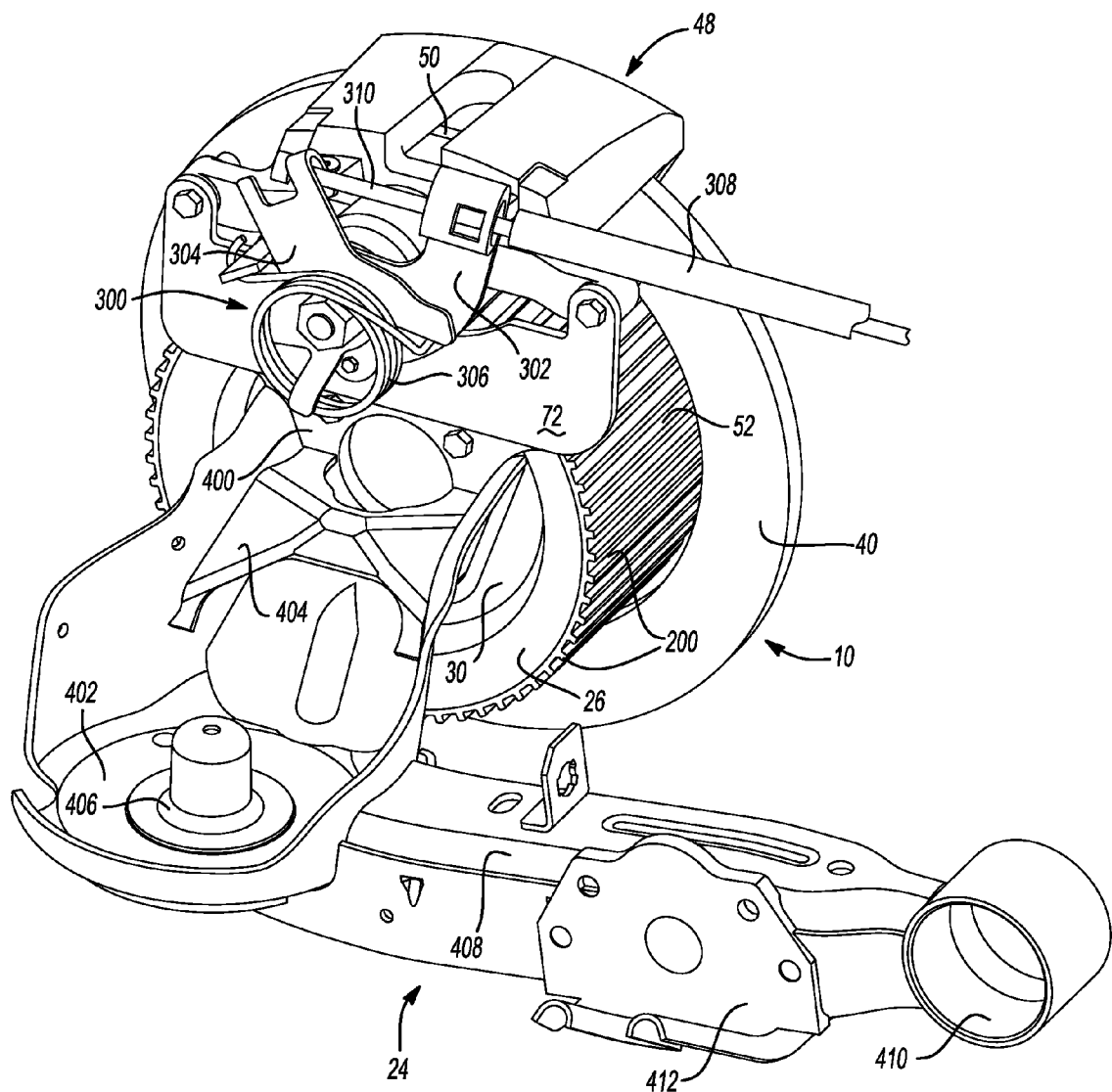
FIG. 5 is similar to FIG. 4 and shows an inboard side thereof.
Figure 6:
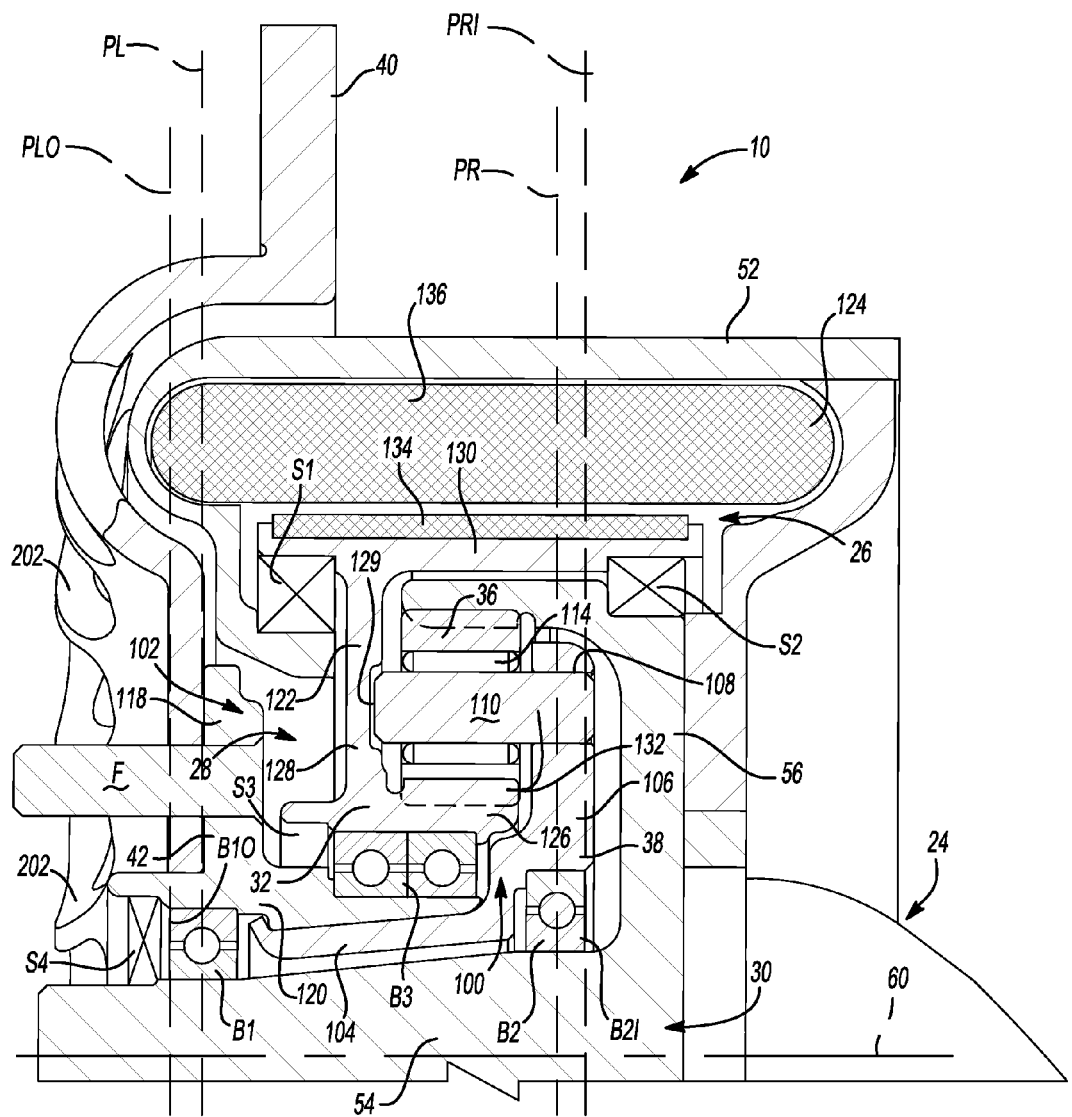
FIG. 6 is a cross-sectional view of FIG. 4 showing a portion of a planetary gearset operable in the electric wheel motor assembly.

With reference to FIGS. 4 and 5, one of the electric motor assemblies 10 is shown that can be retrofit or can be originally assembled to a suspension component 24 that can be part of the rear suspension 16 (FIG. 3). With reference to FIG. 6, the electric wheel motor assembly 10 can include an electric motor 26, a planetary gearset 28 and a wheel spindle 30. The planetary gearset 28 can include a sun gear 32, a ring gear 34 and a plurality of planet gears 36 that can be rotatably supported on a planet carrier 38. It will be appreciated that when a first component or an input of the planetary gearset 28 is driven and a second component of the planetary gearset 28 is held rotationless, a third component or an output of the planetary gearset 28 can spin at an output rotational velocity that is less than the input rotational velocity. The torque transmitted through the output, however, is greater than the torque received at the input.

In the example provided, the sun gear 32 is the input, the ring gear 34 is maintained in a stationary (non-rotating) condition, and the planet carrier 38 is the output; but it will be appreciated that other configurations are possible such that modifications are within the capabilities of one skilled in the art. The ring gear 34 can be formed onto a portion of the wheel spindle 30, which can be fixedly coupled to the suspension component 24. The sun gear 32 can be driven by the electric motor 26. The planet carrier 38 can be driven by the sun gear 32 via the planet gears 36. Upon activation of the electric motor 26, the planetary gearset 28 can provide, for example, a gear reduction ratio of about 1:2.64.

Figure 9:
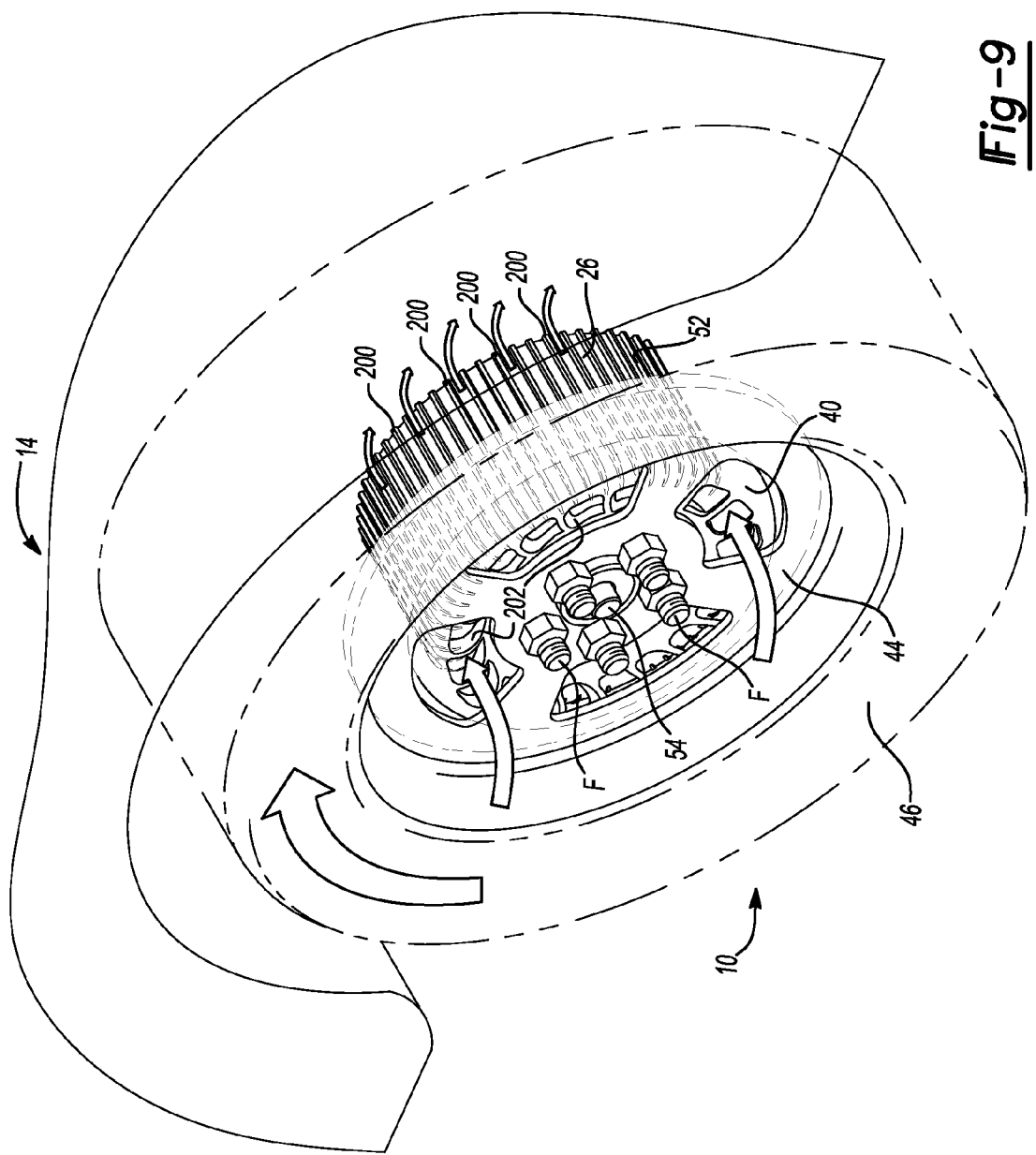
FIG. 9 is a perspective view of the electric wheel motor assembly of FIG. 4 showing active cooling of the electric motor with the brake rotor having vanes formed therethrough.

With reference to FIGS. 4 and 5, the electric wheel motor assembly 10 can also include a brake rotor 40 that can couple to a flange portion 42 (FIG. 7) of the planet carrier 38. With reference to FIG. 9, a wheel rim 44 can additionally support a pneumatic rubber tire 46. The wheel rim 44 can also couple to the flange portion 42 (FIG. 7) with the brake rotor 40 disposed therebetween, as shown in FIG. 6. Returning to FIGS. 4 and 5, a caliper 48 having brake pads 50 can be mounted to the suspension component 24 and can clamp against the brake rotor 40. The brake rotor 40 can spin relative to a housing 52 of the electric motor 26 that can also connect to the suspension component 24.

The electric wheel motor assembly 10 can generally be an annular structure symmetrical about the wheel spindle 30. For purposes of this disclosure and with reference to FIG. 6, the following discussion generally begins with a spindle portion 54 of the wheel spindle 30 and proceeds radially outward (upward relative to FIG. 6) toward the electric motor 26, the brake rotor 40, etc.

Figure 7:
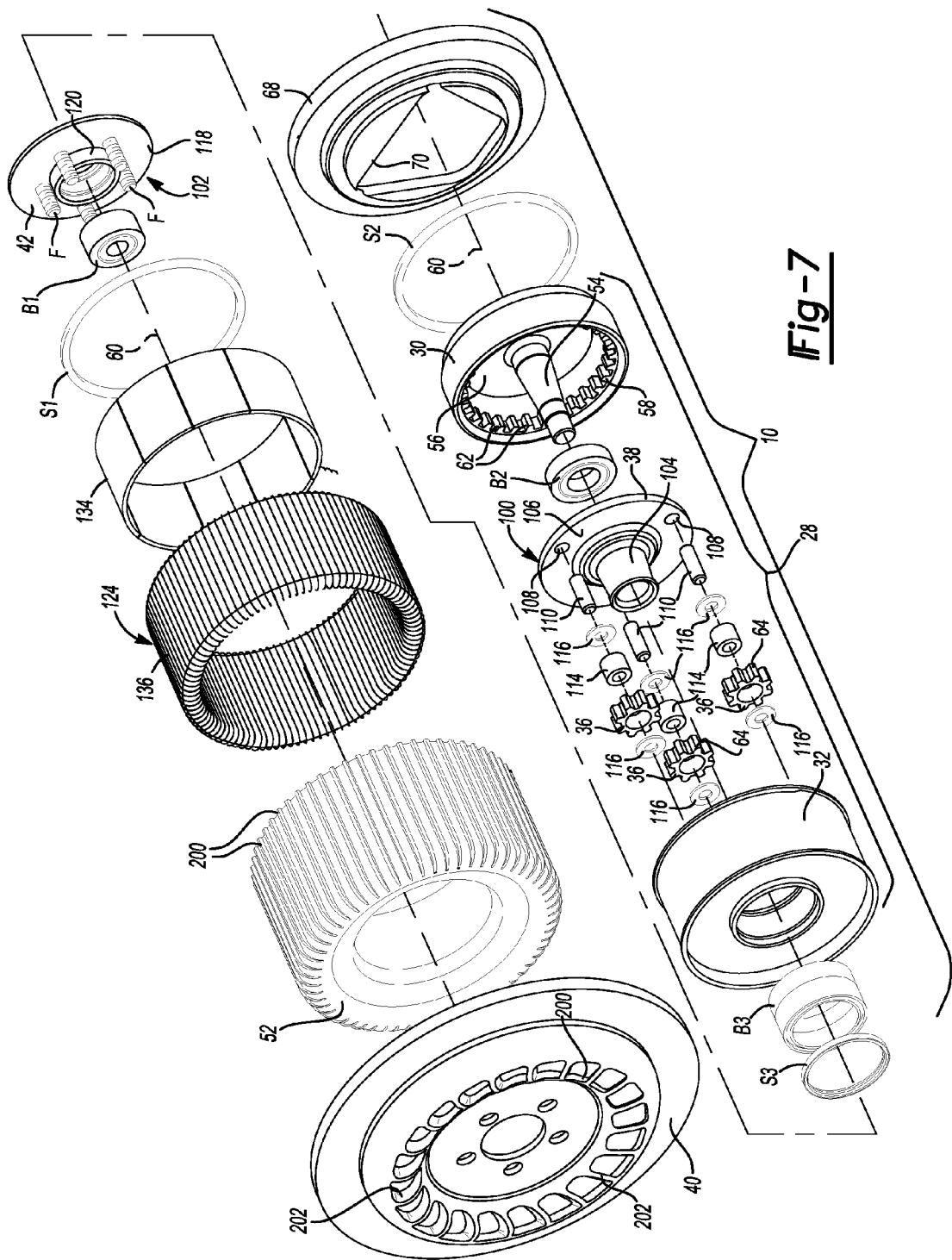
FIG. 7 is an exploded assembly view of the electric wheel motor assembly of FIG. 4 showing a planetary gearset, an electric motor and a brake rotor in accordance with the present teachings.
Figure 8:
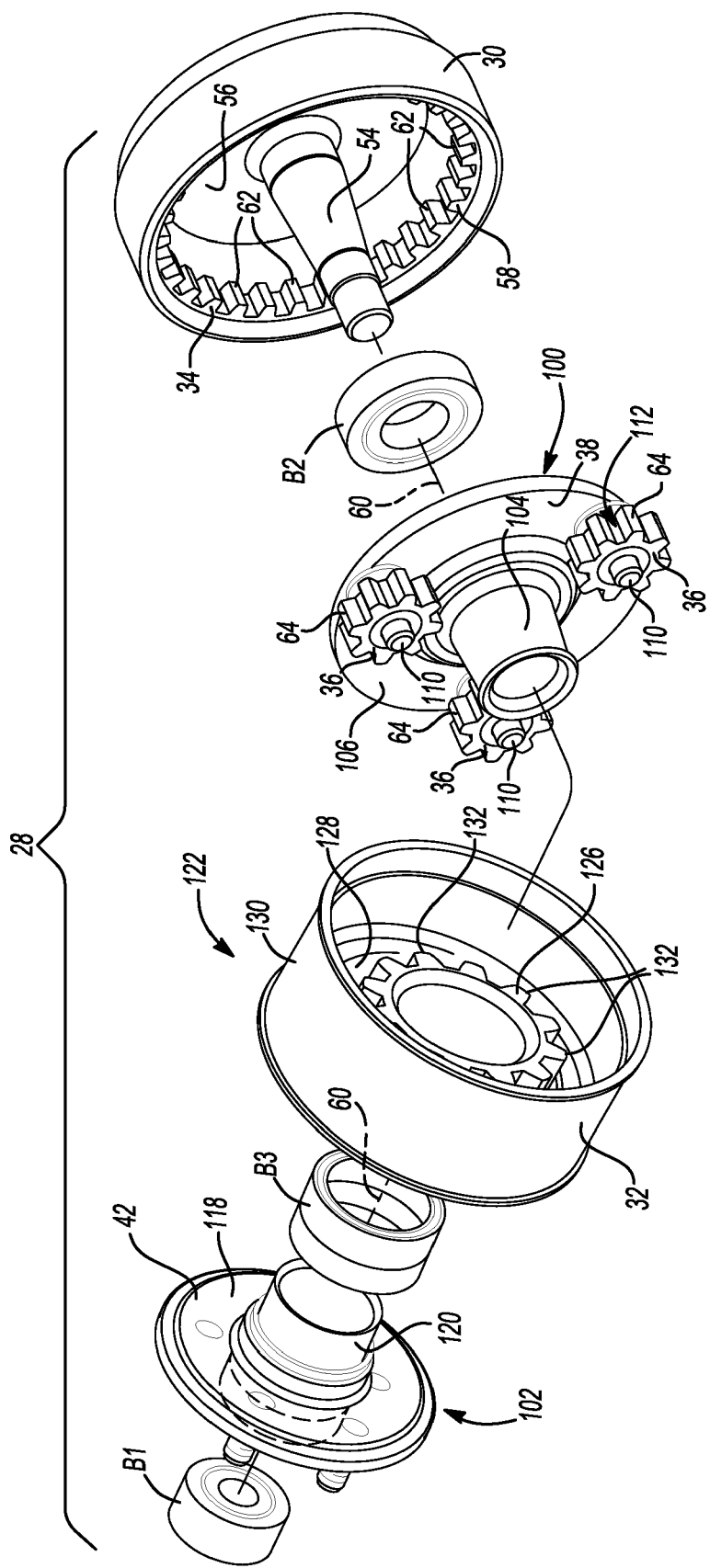
FIG. 8 is a partial exploded assembly view of the electric wheel motor assembly of FIG. 4 showing the planetary gearset.

With reference to FIGS. 6, 7 and 8, the wheel spindle 30 can include the spindle portion 54, a spindle bridge portion 56 and a ring gear portion 58. The spindle portion 54 can define a central axis 60 about which the brake rotor 40 and portions of the planetary gearset 28 can spin. The spindle bridge portion 56 can extend in a generally perpendicular direction between the spindle portion 54 and the ring gear portion 58. The ring gear portion 58 can be concentric with the spindle portion 54 and can be generally parallel to the central axis 60. The ring gear portion 58 can be associated with the planetary gearset 28 and can include a plurality of gear teeth 62 that can engage gear teeth 64 on the planet gears 36. The wheel spindle 30 can be fixedly coupled to the suspension component 24 and, therefore, the ring gear portion 58 can remain rotation less.

A first wheel bearing B1 and a second wheel bearing B2 can be disposed between the spindle portion 54 and the planet carrier 38 to permit the planet carrier 38 to rotate about the wheel spindle 30. The first wheel bearing B1 can be disposed in a position that is outboard of the second wheel bearing B2. Outboard can refer to a direction away from the suspension component 24 to which the wheel spindle 30 is attached. Inboard can refer to a direction toward the suspension component 24. The first wheel bearing B1 can establish a first imaginary plane PL that can extend in a radial direction outwardly from the first wheel bearing B1 (i.e., radially away from the spindle portion 54). The second wheel bearing B2 can establish a second imaginary plane PR that can extend in a radial direction outwardly from the second wheel bearing B2. The first imaginary PL and the second imaginary plane PR can be generally perpendicular to the central axis 60.

A sun gear bearing B3 can be disposed between the planet carrier 38 and the sun gear 32 and can permit the sun gear 32 to rotate relative to the planet carrier 38. The sun gear 32 of the planetary gearset 28 can also be disposed between the first imaginary plane PL and the second imaginary plane PR. Moreover, the sun gear bearing B3 can be disposed between the first imaginary plane PL and the second imaginary plane PR of the first wheel bearing B1 and the second wheel bearing B2, respectively.

Further, the first wheel bearing B1 can have an outboard face B1O (i.e., a face farthest from the suspension component 24), while the second wheel bearing B2 can have an inboard face B2I (i.e., a face closest to the suspension component 24). The outboard face B1O of the first wheel bearing B1 can be associated with a third imaginary plane PLO. The inboard face B2I of the second wheel bearing B2 can be associated with a fourth imaginary plane PRI. The sun gear 32, the planet gears 36 and/or the sun gear bearing B3 can be contained between the third imaginary plane PLO and the fourth imaginary plane PRI.

The planet carrier 38 can be formed from a first carrier member 100 and a second carrier member 102. The first carrier member 100 can rotatably support the planet gears 36. The second carrier member 102 can couple to the wheel rim 44 (FIG. 9) and/or the brake rotor 40. The first carrier member 100 can include a hub portion 104 and a flange portion 106. The flange portion 106 can include three apertures 108. Each of the apertures 108 can receive a pin 110 that can rotatably support one of the planet gears 36.

Each planet gear 36 can have a plurality of gear teeth 64 on an outer periphery 112. A needle bearing 114 can be disposed between each planet gear 36 and its respective pin 110. A pair of thrust bearings 116 can be disposed on each side of each of the planet gears 36. While three planet gears 36 are illustrated in FIG. 7, additional planet gears can be rotatably coupled to the flange portion 106 of the first carrier member 100. Moreover, while straight toothed gears (e.g., spur gears) are illustrated, it will be appreciated that gears with other tooth forms (e.g., helical) and/or other suitable types of gears can be used.

The second carrier member 102 can include a flange portion 118 and a hub portion 120. The hub portion 120 of the second carrier member 102 can couple to the hub portion 104 of the first carrier member 100 and can form a fixed (i.e., rotationless) connection between the first carrier member 100 and the second carrier member 102. The flange portion 118 of the second carrier member 102 can have a plurality of threaded holes formed thereon to receive respective threaded fasteners, such as threaded studs (F) that can extend outwardly from the flange portion 118. Whether using threaded studs (F) or threaded bolts, the brake rotor 40 and the wheel rim 44 can couple to the flange portion 118 of the second carrier member 102.

The electric motor 26 can include a rotor 122 and a stator 124. The rotor 122 of the electric motor 26 can generally include a sun gear portion 126, a bridge portion 128, and a magnet portion 130. The sun gear portion 126 can be concentric with the magnet portion 130 and can be generally perpendicular to the bridge portion 128. The bridge portion 128 can extend between and connect the sun gear portion 126 and the magnet portion 130. The bridge portion 128 can include an annular groove 129 that can receive portions of the pins 110 that rotatably support the planet gears 36. The sun gear portion 126 can include a plurality of gear teeth 132 and can form the sun gear 32 of the planetary gearset 28. To that end, the sun gear portion 126 can meshingly engage with the planet gears 36. The magnet portion 130 can extend from the bridge portion 128 and can hold one or more magnets 134 that can form an additional annular structure around the rotor that can be electrically associated with the electric motor 26.

A plurality of electric windings 136 can be connected to the housing 52 of the electric motor 26 and can at least partially form the stator 124 of the electric motor 26. The housing 52 of the electric motor 26 can be fixedly coupled to the suspension component 24 along with the wheel spindle 30 having its ring gear portion 58. As voltage is applied to the electric motor 26, the input torque can be delivered to the planetary gearset 28 via the sun gear portion 126 of the rotor 122. Because the stator 124 and the ring gear portion 58 of the wheel spindle 30 are maintained in a non-rotating condition (i.e., remain rotationless) in the example provided, the electric motor can drive the planet carrier 38 via the planet gears 36.

The housing 52 of the electric motor 26 can contain the plurality of electric windings 136 that can form the stator 124 of the electric motor 26. The windings 136 can include a suitable copper wire winding pattern. The windings can remain rotationless within the housing 52 but the magnets 134 can be coupled to the magnet portion 130 of the rotor 122 and can be generally opposite the windings 136 and form an air gap therebetween. The magnets 134 of the rotor 122, therefore, can spin relative to the windings 136, when voltage is applied to the electric motor 26.

The housing 52 of the electric motor 26 can include a first seal S1 and a second seal S2. The first seal S1 can seal the rotor 122 to the housing 52. The second seal S2 can seal the rotor 122 to the wheel spindle 30 at a location that can be near the spindle bridge portion 56 and the ring gear portion 58. As such, the first seal S1 and the second seal S2 can provide a seal (e.g., a lubrication seal) between the planetary gearset 28 and the plurality of windings 136 of the electric motor 26. The windings 136 can be disposed a predetermined distance away from the plurality of the magnets 134 to insure the air gap therebetween.

A third seal S3 can seal the sun gear bearing B3 to maintain the lubrication for the sun gear bearing B3. A fourth seal S4 can seal the first wheel bearing S1 to the hub portion 120 of the second carrier member 102 and to the wheel spindle 30 and, therefore, seal lubrication in the planetary gearset 28 for, among other things, the first and second wheel bearings B1, B2.

A plurality of cooling fins 200 can extend radially outward from the housing 52 of the electric motor 26. The cooling fins 200 can be exposed to the environment. In this regard, the cooling fins 200 can facilitate heat removal from the electric motor 26, as heat is dispersed into the surrounding environment.

In one aspect of the present teachings and with respect to FIG. 9, the brake rotor 40 can contain a plurality of vanes 202 that can be configured to forcefully direct air over the cooling fins 200 on the housing 52, when the brake rotor 40 spins relative thereto. The electric motor 26 generates heat when it provides torque to drive the planetary gearset 28 and thus drive the wheel rim 44 and tire 46. When the vehicle 14 is moving, whether there is power to the electric motor 26 or not, the rotation of the tire 46, and thus the rotation of the brake rotor 40, can provide forced air or active cooling to the electric motor 26. In this regard, rotation of the brake rotor 40 can force cooling air from the vanes 202 of the brake rotor 40 over the cooling fins 200 to cool the electric motor 26.

With reference to FIG. 5, the brake caliper 48 can be coupled to (or packaged with) the electric wheel motor assembly 10 and can provide a braking mechanism that can slow the brake rotor 40 and thus slow the vehicle 14. The brake caliper 48 can include a parking brake assembly 300 to further provide parking brake functionality, when the vehicle 14 is on a hill or otherwise. The parking brake assembly 300 can include an arm 302 and a lever 304 that can be biased in a first position by a spring 306. The arm 302 can hold a brake cable 308 from which an actuator line 310 can extend. The actuator line 310 can pass through the arm 302 and can be held by the lever 304. By pulling on the actuator line 310, e.g., via a brake lever (not shown) in the vehicle, the lever 304 can be drawn toward the arm 302 and can extend a piston (not shown) in the brake caliper 48 toward the brake rotor 40. As the force on the brake cable is released, the lever 304 can return to an initial position away from the arm 302, urged by the spring 306. The parking brake assembly 300 can then release the piston (not shown) to move away from the brake rotor 40.

In one aspect, the suspension component 24 to which the electric wheel motor assembly 10 can couple can be a wheel bearing mount 400 that can be coupled to a spring pocket 402. A brace 404 can further secure the electric wheel motor assembly 10 to the wheel bearing mount 400. A spring seat 406 can be coupled to the spring pocket 402 and can receive, for example, a spring (not shown) that can suspend the electric wheel motor assembly 10 from the vehicle 14. A control arm 408 can couple to the spring pocket 402 and can further couple to other portions of the vehicle body 14a (FIG. 3) via a bushing sleeve 410. In addition, a twist beam mounting plate 412 can couple to the control arm 408. The wheel bearing mount 400 can extend through a back cover 68 (FIG. 7) of the housing 52 of the electric motor 26 and can couple to the wheel spindle 30. It will be appreciated that the hybrid electric all wheel drive system 12 (FIG. 3) need not rely on any specific vehicle suspension configuration and further need not rely on access to a transmission or exhaust tunnel. In this regard, the all wheel drive system 12 can be implemented on or with any type of suspension.

In accordance with one aspect of the present teachings and with reference to FIG. 3, the hybrid electric all wheel drive system 12 can provide a part time drive to the rear wheels 22 of the vehicle 14. Myriad situations can benefit from drive torque delivered to the rear wheels 22, such as, but not limited to, a situation requiring sudden acceleration. In this regard, an engine computer 500 and/or an electric all-wheel drive module 502 can detect that a driver is requesting more power. The engine computer 500 and/or the electric all-wheel drive module 502 can then activate the all wheel drive system 12 to provide additional torque to the real wheels 22, while the engine 18 of the vehicle 14 can provide torque to the front wheels 20 via a suitable drivetrain 504. The electric all-wheel drive module 502 can regulate power directed from a battery 508 to the driver side electric motor assembly 10*a* and/or to the passenger side electric motor assembly 10*b*. In this situation, the torque from both the engine 18 and the all wheel drive system 12 can provide relatively faster acceleration time compared to torque only delivered to the front tires 20.

In a stability control situation, the engine computer 500 and/or the electric all-wheel drive module 502 can detect slip from one of the vehicle wheels 20, 22 and can, therefore, provide torque to one or both of the rear wheels 22 to aid in the stability situation. A conventional anti-lock brake system can be employed, for example, to detect slip at each of wheels 20, 22. The electric motor assemblies 10 can be controlled by a control module 512 that can be part of or included with the engine computer 500 and/or the electric all-wheel drive module 502. The control module 512 can also be resident in other portions of the vehicle 14.

A wheel spindle from a conventional rear wheel assembly can be removed from a wheel bearing mount 510. When the conventional rear wheel assembly is removed, the brake rotor, wheel rim and brake caliper or brake drum can also be removed with the conventional assembly. The electric wheel motor assembly 10*a*, 10*b* can then be mounted to the wheel bearing mount 510. Specifically and with reference to FIGS. 3, 5 and 7, the back cover 68 of the housing 52 can include an aperture 70 sized to receive the wheel bearing mount 400 such that the wheel bearing mount 400 can pass through the housing 52 of the electric motor 26 and couple to the wheel spindle 30. Moreover, the brake caliper 48 can couple to a flange 72 coupled to the wheel bearing mount 400 and can clamp against the brake rotor 40 when the service brakes (not specifically shown) are engaged.

In accordance with one aspect of the present teachings, each of the electric wheel motor assemblies 10 can, after the gear reduction of the planetary gearset 28, provide drive torque to each of the rear wheels 22. In particular example provided, each electric wheel motor assemblies 10 can provide a maximum torque of about 250 foot pounds for about sixty seconds. When producing less torque, the electric wheel motor assemblies can be activated for longer periods. It will be appreciated that using the planetary gearset 28 in series with the electric motor 26 can provide the ability to reduce the size of the electric motor 26 because of the mechanical advantage of the planetary gearset 28. Moreover, because the all wheel drive system 12 can be a part time system, and therefore not full time system, liquid cooling of the electric motor 26 may not be necessary. As such, the all wheel drive system 12 can be a completely air-cooled system.

While specific aspects have been described in this specification and illustrated in the drawings, it will be understood by those skilled in the art that various changes can be made and equivalents can be substituted for elements thereof without departing from the scope of the present teachings, as defined in the claims. Furthermore, the mixing and matching of features, elements and/or functions between various aspects of the present teachings may be expressly contemplated herein so that one skilled in the art will appreciate from the present teachings that features, elements and/or functions of one aspect of the present teachings may be incorporated into another aspect, as appropriate, unless described otherwise above. Moreover, many modifications may be made to adapt a particular situation, configuration or material to the present teachings without departing from the essential scope thereof. Therefore, it may be intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A drive system for driving a wheel of a vehicle, the drive system comprising:
   a control arm having a bushing sleeve at a first end, the bushing sleeve defining a pivot axis that is perpendicular to a longitudinal axis of the control arm;
   a wheel bearing mount fixedly coupled to a second end of the control arm opposite the first end, the wheel bearing mount including a first portion, which is oriented parallel to the pivot axis, and a second portion that is coupled to a distal end of the first portion, the second portion defining a wheel mount;
   a wheel spindle fixedly coupled to the wheel mount and defining a wheel axis that is disposed in a fixed position relative to the pivot axis and the longitudinal axis of the control arm;
   a reduction gear set mounted on the wheel spindle, the reduction gear set including an input member and an output member; and
   an electric motor having a stator, which is fixedly coupled to the wheel mount, and a rotor that is coupled to the input member and rotatable about the wheel axis.

2. The drive system of claim 1, further comprising a spring seat mounted to one of the control arm and the wheel bearing mount, the spring seat being adapted for receiving a spring that biases the control arm about the pivot axis.

3. The drive system of claim 2, wherein the axle mount includes a plate that is disposed on a lateral side of the control arm opposite the electric motor.

4. The drive system of claim 1, further comprising a brake caliper coupled to the wheel mount.

5. The drive system of claim 4, wherein the brake caliper is mounted on an intermediate member and the intermediate member is fixedly mounted on the wheel mount.

6. The drive system of claim 5, further comprising a parking brake assembly with a lever and a torsion spring that are pivotally mounted to the intermediate member, the lever being coupled to the brake caliper such that pivoting of the lever causes operation of the brake caliper.

7. The drive system of claim 1, wherein the reduction gear set is a planetary gear set.

8. The drive system of claim 7, wherein the planetary gear set includes a ring gear that is fixedly coupled to the wheel spindle.

9. The drive system of claim 7, wherein the planetary gear set includes a sun gear that is driven by the rotor.

10. The drive system of claim 7, wherein the planetary gear set includes a planet carrier that at least partly forms the output member.

11. The drive system of claim 10, wherein the planet carrier includes a first carrier portion and a second carrier portion that is fixedly coupled to the first carrier portion for rotation therewith, the first carrier portion including a plurality of pins onto each of which a planet gear is rotatably mounted.

12. The drive system of claim 11, wherein a bearing is mounted on the second carrier portion, the bearing supporting a sun gear for rotation on the planet carrier.

13. The drive system of claim 11, wherein the first and second carrier portions having mating frustoconical surfaces that abut one another.

14. The drive system of claim 1, further comprising an axle mount mounted on the control arm and disposed at a location on the control arm between the pivot axis and the wheel axis.

15. A drive system for driving a wheel of a vehicle, the drive system comprising:
a control arm having a bushing sleeve at a first end, the bushing sleeve defining a pivot axis that is perpendicular to a longitudinal axis of the control arm;
a wheel bearing mount fixedly coupled to a second end of the control arm opposite the first end, the wheel bearing mount including a first portion, which is oriented parallel to the pivot axis, and a second portion that is coupled to a distal end of the first portion, the second portion defining a wheel mount;
a wheel spindle fixedly coupled to the wheel mount and defining a wheel axis that is disposed in a fixed position relative to the pivot axis and the longitudinal axis of the control arm;
a planetary gear set having a ring gear, a sun gear, a planet carrier and a plurality of planet gears, the ring gear being fixed to the wheel spindle, the sun gear being rotatably mounted on the wheel spindle and rotatable about the wheel axis, the planet carrier including a plurality of pins, each of the planet gears being rotatably mounted on an associated one of the pins; and
an electric motor having a stator, which is fixedly coupled to the wheel mount, and a rotor that is coupled to the sun gear and rotatable for driving the sun gear about the wheel axis;
a spring seat mounted to one of the control arm and the wheel bearing mount, the spring seat being adapted for receiving a spring that biases the control arm about the pivot axis;
a brake assembly coupled to the wheel mount, the brake assembly including a flange, a brake caliper and a parking brake assembly, the flange being mounted to the wheel mount, the brake caliper being mounted to the flange, the parking brake assembly having a lever and a torsion spring that are pivotally mounted to the flange, the lever being coupled to the brake caliper such that pivoting of the lever causes operation of the brake caliper; and
an axle mount mounted on the control arm and disposed at a location on the control arm between the pivot axis and the wheel axis;
wherein the planet carrier includes a first carrier portion and a second carrier portion that is fixedly coupled to the first carrier portion for rotation therewith, the first carrier portion including the plurality of pins, wherein a bearing is mounted on the second carrier portion, the bearing supporting the sun gear for rotation on the planet carrier and wherein the first and second carrier portions having mating frustoconical surfaces that abut one another.

16. A drive system for driving a wheel of a vehicle, the drive system comprising:
a control arm having a bushing sleeve at a first end, the bushing sleeve defining a pivot axis that is perpendicular to a longitudinal axis of the control arm;
a wheel bearing mount fixedly coupled to a second end of the control arm opposite the first end, the wheel bearing mount including a first portion, which is oriented parallel to the pivot axis, and a second portion that is coupled to a distal end of the first portion, the second portion defining a wheel mount;
a wheel spindle fixedly coupled to the wheel mount and defining a wheel axis that is disposed in a fixed position relative to the pivot axis and the longitudinal axis of the control arm;
a reduction gear set mounted on the wheel spindle, the reduction gear set including an input member and an output member;
an electric motor having a stator, which is fixedly coupled to the wheel mount, and a rotor that is coupled to the input member and rotatable about the wheel axis;
a spring seat mounted to one of the control arm and the wheel bearing mount, the spring seat being adapted for receiving a spring that biases the control arm about the pivot axis; and
an axle mount mounted on the control arm and disposed at a location on the control arm between the pivot axis and the wheel axis.

17. The drive system of claim 16, further comprising a brake caliper coupled to the wheel mount.

18. The drive system of claim 17, wherein the brake caliper is mounted on an intermediate member and the intermediate member is fixedly mounted on the wheel mount.

19. The drive system of claim 18, further comprising a parking brake assembly with a lever and a torsion spring that are pivotally mounted to the intermediate member, the lever being coupled to the brake caliper such that pivoting of the lever causes operation of the brake caliper.

20. The drive system of claim 16, wherein the reduction gear set is a planetary gear set.

21. The drive system of claim 20, wherein the planetary gear set includes a ring gear that is fixedly coupled to the wheel spindle.

22. The drive system of claim 20, wherein the planetary gear set includes a sun gear that is driven by the rotor.

23. The drive system of claim 20, wherein the planetary gear set includes a planet carrier that at least partly forms the output member.

24. The drive system of claim 23, wherein the planet carrier includes a first carrier portion and a second carrier portion that is fixedly coupled to the first carrier portion for rotation therewith, the first carrier portion including a plurality of pins onto each of which a planet gear is rotatably mounted.

25. The drive system of claim 24, wherein a bearing is mounted on the second carrier portion, the bearing supporting a sun gear for rotation on the planet carrier.

26. The drive system of claim 25, wherein the first and second carrier portions having mating frustoconical surfaces that abut one another.

27. The drive system of claim 16, wherein the axle mount includes a plate that is disposed on a lateral side of the control arm opposite the electric motor.

\* \* \* \* \*